No. 664,281. Patented Dec. 18, 1900.
W. LOEBINGER.
AUTOMATIC CYCLE PUMP.
(Application filed Feb. 23, 1900.)
(No Model.)
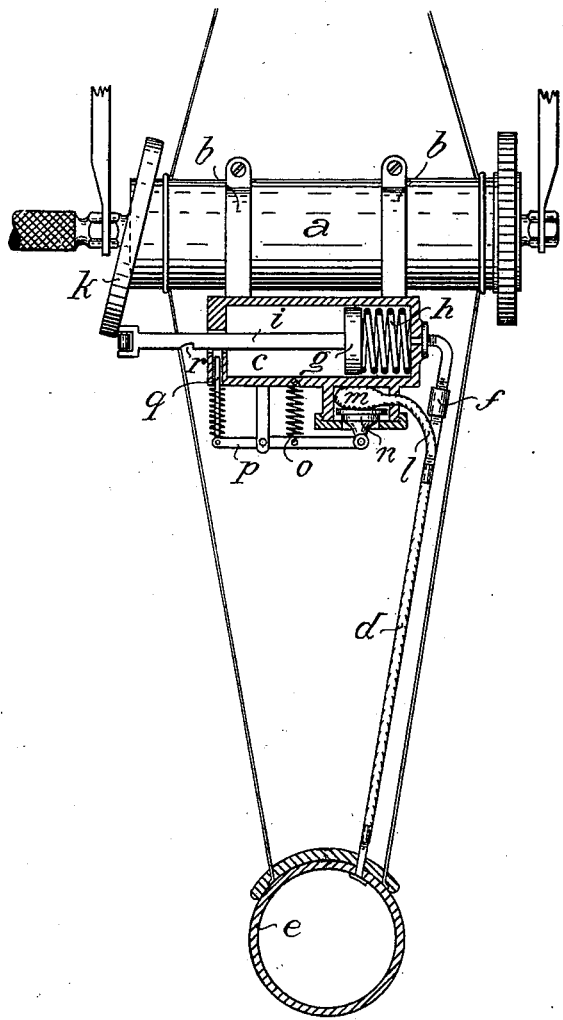
Witnesses:
J. D. McMahon.
L. M. Shireman.
Inventor,
Wilhelm Loebinger
by B. Singer
Att'y.

UNITED STATES PATENT OFFICE.

WILHELM LOEBINGER, OF BERLIN, GERMANY.

AUTOMATIC CYCLE-PUMP.

SPECIFICATION forming part of Letters Patent No. 664,281, dated December 18, 1900.

Application filed February 23, 1900. Serial No. 6,259. (No model.)

*To all whom it may concern:*

Be it known that I, WILHELM LOEBINGER, a subject of the King of Prussia, German Emperor, residing at No. 15 Claudiusstrasse, Berlin, Germany, have invented new and useful Improvements in Automatic Cycle-Pumps, of which the following is a specification.

This invention has for its object an automatic cycle-pump which is fixed on the axles of the front and rear wheels, and thus rotates with the wheels, and is operated at each revolution by a suitable cam or contact on the cycle-frame.

The invention consists in the peculiar arrangement by means of which the pump, in case of need, may be thrown into or out of action and which acts entirely automatically.

The object of the invention is shown in the accompanying drawing diagrammatically, and, as an example, in its application to the rear wheel of a cycle.

The arrangement and mode of working of this apparatus is as follows: A pump-cylinder $c$ is attached to the hub of the wheel $a$ by means of clamps $b$, which pump-cylinder is connected by means of a pipe $d$ with the air-tube $e$, and the back-pressure valve $f$ is no longer, as hitherto, arranged on the wheel-rim, but in close proximity to the pump-cylinder $c$. In the pump-cylinder $c$ a piston $g$ is constantly pressed outward by means of a spring $h$, so that the piston-rod $i$ is pressed with the slide-roller on its outer end against a fixed contact-cam $k$ on the cycle-frame. On the rotation of the wheel the pump-piston is operated accordingly, corresponding to the shape of the contact or cam $k$, and thus the air-tube $e$ is inflated. When the latter is sufficiently inflated—that is to say, when a maximum pressure or even an excess pressure is produced therein—an automatic stopping of the pump must take place. For this object a branch pipe $l$ is arranged on the pipe $d$ behind the valve $f$, which branch pipe ends in an india-rubber bag $m$, which is arranged in a fixed casing. When this bag is inflated in consequence of the maximum pressure existing in the air-tube, it presses outwardly a piston $n$ against the action of a spring $o$ in such a way that a double-armed lever $p$ is caused to turn on its pivot to a certain extent. The other end of this double-armed lever $p$ thereby presses a bolt $q$ against the piston-rod $i$ in such a way that this bolt $q$ engages in a notch $r$ of the piston-rod $i$ as soon as the latter in its movement reaches a suitable place. The action of the pump then ceases immediately, as this position corresponds to the innermost stroke of the piston, and the pump is immediately stopped. If the air-pressure in the air-tube $e$ diminishes in consequence of leakage or the like, the pressure in the bladder $m$ also, of course, diminishes, so that the spring $o$ is in a position to press inward the piston $n$ by means of the lever $p$. The pawl $q$ is thereby simultaneously thrown out of the notch $r$ of the piston-rod $i$, so that the action of the pump again immediately commences and continues until it is again thrown out of action in the manner hereinbefore described. The throwing into action and out of action of the pump is thus automatic.

Having now described my invention, what I desire to secure by Letters Patent of the United States is—

In an automatic cycle-pump consisting of a cylinder secured to the hub of the wheel and having a pipe connection with the interior of a pneumatic tire, a spring-held piston arranged within the cylinder and provided with a notched rod or stem carrying a roller at its outer end, a fixed cam contacting with said roller when the pump is in operation, in combination with a controlling device consisting of an expansible bag connected with the pipe connection aforesaid, a spring-held lever carrying at one end a piston adapted to be operated by said expansible bag, and at the other end a pin or bolt adapted to engage the notch in the piston-rod aforesaid, substantially in the manner and for the purpose set forth.

In witness whereof I have hereunto set my hand in presence of two witnesses.

WILHELM LOEBINGER.

Witnesses:
 WOLDEMAR HAUPT,
 HENRY HASPER.